United States Patent
Manchikanti et al.

(10) Patent No.: US 10,221,717 B2
(45) Date of Patent: Mar. 5, 2019

(54) TURBOMACHINE INCLUDING CLEARANCE CONTROL SYSTEM

(71) Applicant: General Electric Company, Schenectady, NY (US)

(72) Inventors: Maruthi Prasad Manchikanti, Bangalore (IN); Donald Earl Floyd, Greenville, SC (US); Wojciech Grzeszczak, Warsaw (PL); Asish Uppath Naraparambath Ramesh, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 408 days.

(21) Appl. No.: 15/164,311

(22) Filed: May 25, 2016

(65) Prior Publication Data

US 2017/0321569 A1    Nov. 9, 2017

(30) Foreign Application Priority Data

May 6, 2016    (PL) .......................................... 417106

(51) Int. Cl.
*F01D 11/16* (2006.01)
*F01D 11/24* (2006.01)
(Continued)

(52) U.S. Cl.
CPC .............. *F01D 11/24* (2013.01); *F01D 11/16* (2013.01); *F01D 25/14* (2013.01); *F01D 25/24* (2013.01);
(Continued)

(58) Field of Classification Search
CPC .......... F01D 11/24; F01D 11/16; F01D 11/14; F01D 25/14; F01D 25/24;
(Continued)

(56) References Cited

U.S. PATENT DOCUMENTS 2,843,354 A * 7/1958 Smith ...................... F01D 5/188
                                                              416/92
3,575,528 A   4/1971 Beam, Jr. et al.
(Continued)

FOREIGN PATENT DOCUMENTS

CN       102562312 A    7/2012
DE         4430302 A1   2/1996
(Continued)

OTHER PUBLICATIONS

U.S. Appl. No. 13/461,035, Office Action 1 dated Dec. 17, 2014, (GEEN-0808), 15 pages.
(Continued)

*Primary Examiner* — Igor Kershteyn
*Assistant Examiner* — Topaz L. Elliott
(74) *Attorney, Agent, or Firm* — Ernest G. Cusick; Hoffman Warnick LLC

(57) ABSTRACT

A gas turbomachine includes a compressor portion, a turbine portion operatively connected to the compressor portion, and a combustor assembly fluidically connected to each of the compressor portion and the turbine portion. A turbine casing includes a body having an outer surface and an inner surface. A clearance control system includes a plurality of fluidically connected fluid channels extending through the turbine casing. The plurality of fluidically connected fluid channels includes a first fluid channel configured to direct a fluid flow in a first axial direction, a circumferential fluid channel configured to direct the fluid flow in a circumferential direction, and a second fluid channel configured to direct the fluid flow in a second axial direction substantially opposite the first axial direction. The first fluid channel includes a first outlet passing through the inner surface, and the second fluid channel including a second outlet passing through the inner surface.

18 Claims, 9 Drawing Sheets

(51) Int. Cl.
*F01D 25/14* (2006.01)
*F01D 25/24* (2006.01)

(52) U.S. Cl.
CPC .... *F05D 2220/32* (2013.01); *F05D 2240/127* (2013.01); *F05D 2250/131* (2013.01); *F05D 2250/132* (2013.01); *F05D 2250/185* (2013.01); *F05D 2250/25* (2013.01); *F05D 2260/2212* (2013.01); *F05D 2260/22141* (2013.01); *Y02T 50/676* (2013.01)

(58) Field of Classification Search
CPC ......... F05D 2250/185; F05D 2250/132; F05D 2260/2212; F05D 2240/127; F15D 1/065
See application file for complete search history.

(56) References Cited

U.S. PATENT DOCUMENTS

| | | | |
|---|---|---|---|
| 3,973,874 A | 8/1976 | Corsmeier et al. | |
| 3,975,901 A | 8/1976 | Hallinger et al. | |
| 4,023,731 A | 5/1977 | Patterson | |
| 4,304,093 A | 12/1981 | Schulze | |
| 4,363,599 A | 12/1982 | Cline et al. | |
| 4,443,389 A * | 4/1984 | Dodds | F28B 1/06 138/38 |
| 4,487,016 A | 12/1984 | Schwarz et al. | |
| 4,613,280 A | 9/1986 | Tate | |
| 4,805,398 A | 2/1989 | Jourdain et al. | |
| 5,120,192 A | 6/1992 | Ohtomo et al. | |
| 5,219,268 A | 6/1993 | Johnson | |
| 5,259,730 A | 11/1993 | Damlis et al. | |
| 5,297,386 A | 3/1994 | Kervistin | |
| 5,363,654 A | 11/1994 | Lee | |
| 5,591,002 A | 1/1997 | Cunha et al. | |
| 5,593,278 A | 1/1997 | Jourdain et al. | |
| 6,116,852 A | 9/2000 | Pierre et al. | |
| 6,152,685 A | 11/2000 | Hagi | |
| 6,179,557 B1 | 1/2001 | Dodd et al. | |
| 6,227,800 B1 | 5/2001 | Spring et al. | |
| 6,419,146 B1 | 7/2002 | Buldhaupt et al. | |
| 6,422,807 B1 | 7/2002 | Leach et al. | |
| 6,428,273 B1 | 8/2002 | Keith et al. | |
| 6,435,813 B1 | 8/2002 | Rieck, Jr. et al. | |
| 6,478,534 B2 | 11/2002 | Bangert et al. | |
| 6,533,547 B2 | 3/2003 | Anding et al. | |
| 6,554,563 B2 | 4/2003 | Noe et al. | |
| 6,641,363 B2 | 11/2003 | Barrett et al. | |
| 6,659,714 B1 | 12/2003 | Tiemann | |
| 6,742,783 B1 | 6/2004 | Lawer et al. | |
| 6,769,875 B2 | 8/2004 | Tiemann | |
| 6,779,597 B2 | 8/2004 | DeMarche et al. | |
| 6,824,351 B2 | 11/2004 | Endries et al. | |
| 6,877,952 B2 | 4/2005 | Wilson | |
| 6,925,814 B2 | 8/2005 | Wilson et al. | |
| 7,347,671 B2 | 3/2008 | Dorling et al. | |
| 7,434,402 B2 | 10/2008 | Paprotna et al. | |
| 7,556,476 B1 | 7/2009 | Liang | |
| 7,658,591 B2 | 2/2010 | Dervaux et al. | |
| 7,740,444 B2 | 6/2010 | Lee et al. | |
| 7,798,775 B2 | 9/2010 | Kammel et al. | |
| 8,127,553 B2 | 3/2012 | Ekkad et al. | |
| 8,128,341 B2 | 3/2012 | Wieghardt | |
| 8,137,055 B2 | 3/2012 | Lang | |
| 8,403,631 B2 | 3/2013 | Surace et al. | |
| 8,549,864 B2 | 10/2013 | Langdon, II et al. | |
| 8,616,827 B2 | 12/2013 | O'Leary | |
| 8,684,660 B2 | 4/2014 | Miranda et al. | |
| 9,404,389 B2 | 8/2016 | Erickson et al. | |
| 9,506,369 B2 * | 11/2016 | Boswell | F01D 11/24 |
| 9,631,808 B2 * | 4/2017 | Taylor | F23M 9/06 |
| 9,719,372 B2 * | 8/2017 | Ballard, Jr. | F01D 25/12 |
| 9,777,636 B2 | 10/2017 | Morrill | |
| 9,926,801 B2 | 3/2018 | Uskert et al. | |
| 9,945,250 B2 * | 4/2018 | Kitamura | F01D 11/24 |
| 10,030,537 B2 * | 7/2018 | Dutta | F01D 9/041 |
| 2002/0071762 A1 | 6/2002 | Schroder | |
| 2002/0071763 A1 | 6/2002 | Brandl et al. | |
| 2003/0035722 A1 | 2/2003 | Barrett et al. | |
| 2010/0247297 A1 | 9/2010 | Legare et al. | |
| 2011/0027068 A1 | 2/2011 | Floyd, II et al. | |
| 2011/0135456 A1 | 6/2011 | Takahashi et al. | |
| 2012/0070302 A1 | 3/2012 | Lee | |
| 2012/0247297 A1 | 10/2012 | Kawaguchi et al. | |
| 2013/0017060 A1 * | 1/2013 | Boswell | F01D 11/24 415/1 |
| 2015/0110612 A1 * | 4/2015 | Brandl | F01D 9/065 415/178 |
| 2017/0284218 A1 * | 10/2017 | Kondo | F02C 7/28 |
| 2017/0292389 A1 * | 10/2017 | Lorstad | B23K 26/21 |
| 2018/0066527 A1 | 3/2018 | Kadau et al. | |

FOREIGN PATENT DOCUMENTS

| | | |
|---|---|---|
| DE | 19823251 C1 | 7/1999 |
| EP | 1152125 A1 | 11/2001 |
| EP | 1780376 A1 | 5/2007 |
| EP | 1806476 A1 | 7/2007 |
| EP | 2243933 A1 | 4/2009 |
| EP | 2410128 A1 | 1/2012 |
| EP | 2 666 971 A1 | 11/2013 |

OTHER PUBLICATIONS

U.S. Appl. No. 13/461,035, Final Office Action 1 dated Apr. 22, 2015, (GEEN-0808), 19 pages.

EP Search Report and Written Opinion dated May 6, 2014 in connection with corresponding EP Patent Application No. 13165921.1.

U.S. Appl. No. 13/461,035, Office Action 2 dated Aug. 19, 2016, (GEEN-0808), 24 pages.

Search Report issued in connection with corresponding PL Application No. P-417106 dated May 24, 2017.

U.S. Appl. No. 13/461,035, Notice of Allowance dated Jun. 12, 2017, (GEEN-0808-US), 10 pages.

U.S. Appl. No. 13/461,035, Office Action 3 dated Feb. 14, 2017, (GEEN-0808-US), 19 pages.

U.S. Appl. No. 15/175,597, Office Action dated Oct. 15, 2018, (GEEN-0809-US2), 31 pages.

U.S. Appl. No. 15/207,743, Office Action dated Oct. 30, 2018, (GEEN-0807-US), 33 pages.

* cited by examiner

US 10,221,717 B2

TURBOMACHINE INCLUDING CLEARANCE CONTROL SYSTEM

BACKGROUND OF THE DISCLOSURE

The subject matter disclosed herein relates to the art of turbomachines and, more particularly, to a turbomachine or turbine casing having a clearance control system.

Gas turbomachines typically include a compressor portion, a turbine portion and a combustor assembly. The combustor assembly mixes fluid from the compressor portion with a fuel to form a combustible mixture. The combustible mixture is combusted forming hot gases that pass along a hot gas path of the turbine portion. The turbine portion includes a number of stages having airfoils mounted to rotors that convert thermal energy from the hot gases into mechanical, rotational energy. Additional fluid from the compressor is passed through a shell of the gas turbomachine for cooling purposes.

BRIEF DESCRIPTION OF THE DISCLOSURE

According to one aspect of an exemplary embodiment, a gas turbomachine includes a compressor portion, a turbine portion operatively connected to the compressor portion, and a combustor assembly fluidically connected to each of the compressor portion and the turbine portion. A turbine casing surrounds, at least in part, the turbine portion. The turbine casing includes a body having an outer surface and an inner surface. A clearance control system includes a plurality of fluidically connected fluid channels extending between the outer and inner surfaces of the turbine casing. The plurality of fluidically connected fluid channels includes a first fluid channel configured to direct a fluid flow in a first axial direction, a circumferential fluid channel configured to direct the fluid flow in a circumferential direction about the turbine casing, and a second fluid channel configured to direct the fluid flow in a second axial direction substantially opposite the first axial direction. The first fluid channel includes a first outlet passing through the inner surface, and the second fluid channel includes a second outlet passing through the inner surface.

According to another aspect of an exemplary embodiment, a gas turbomachine includes a compressor portion, a turbine portion operatively connected to the compressor portion, and a combustor assembly fluidically connected to each of the compressor portion and the turbine portion. A turbine casing extends about, at least in part, the turbine portion. The turbine casing includes a body having an outer surface and an inner surface. A clearance control system includes a plurality of fluidically connected fluid channels extending between the outer and inner surfaces of the turbine casing. At least one of the plurality of fluidically connected of fluid channels includes a tabulator member configured and disposed to enhance convective cooling of the turbine casing.

According to another aspect of an exemplary embodiment, a turbine casing for a gas turbomachine is provided. The gas turbomachine may include a compressor portion, a turbine portion operatively connected to the compressor portion, and a combustor assembly fluidically connected to each of the compressor portion and the turbine portion. The turbine casing may include a body extending about, at least in part, the turbine portion, the body including an outer surface and an inner surface. A clearance control system may include a plurality of fluidically connected fluid channels extending between the outer and inner surfaces. At least one of the plurality of fluidically connected fluid channels may include a turbulator configured and disposed to enhance convective thermal transfer between a thermal transfer fluid and the turbine casing.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION OF THE DISCLOSURE

Figure 1:
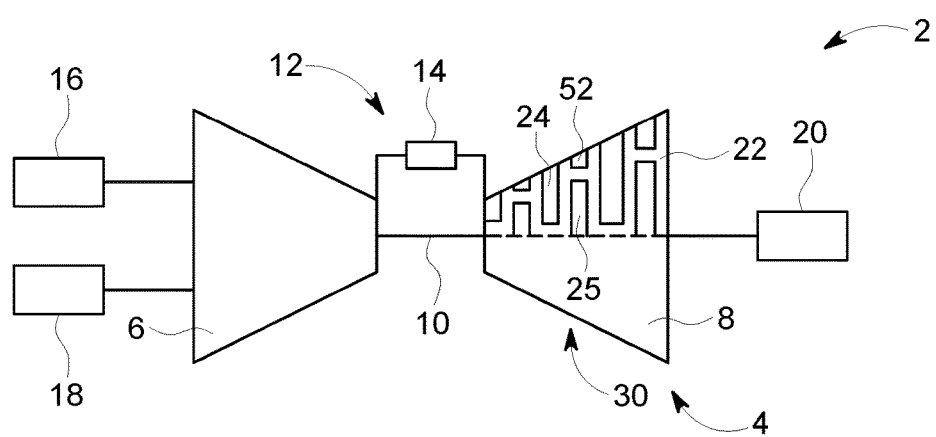
FIG. 1 is a schematic view of a turbomachine system including a turbomachine having a clearance control system, in accordance with an exemplary embodiment.

A turbomachine system, in accordance with an exemplary embodiment, is indicated generally at 2, in FIG. 1. Turbomachine system 2 may include a turbomachine 4 having a compressor portion 6 and a turbine portion 8 operatively connected through a common compressor/turbine shaft 10. A combustor assembly 12 may be fluidically connected between compressor portion 6 and turbine portion 8. Combustor assembly 12 may include at least one combustor 14 that directs products of combustion toward turbine portion 8 through a transition piece (not shown). An intake system 16 may fluidically connect to an inlet (not separately labeled) of compressor portion 6. In addition, a load 18 is mechanically linked to turbomachine 4 and an exhaust system 20 is operatively connected to an outlet (also not separately labeled) of turbine portion 8.

In operation, air is passed through intake system 16 into compressor portion 6. Intake system 16 may condition the air by, for example, lowering humidity, altering temperature, and the like. The air is compressed through multiple stages of compressor portion 6 and passed to turbine portion 8 and combustor assembly 12. The air is mixed with fuel, diluents, and the like, in combustor 14 to form a combustible mixture. The combustible mixture is passed from combustor 14 into turbine portion 8 via the transition piece as hot gases. The hot gases flow along a hot gas path 22 of turbine portion 8. The hot gases pass through a plurality of stages (not separately labeled) interacting with one or more stationary airfoils, such as shown at 24, and rotating airfoils, such as shown at 25, to produce work. The hot gases then pass as exhaust into exhaust system 20. The exhaust may be treated and expelled to ambient or used as a heat source in another device (not shown).

Figure 2:
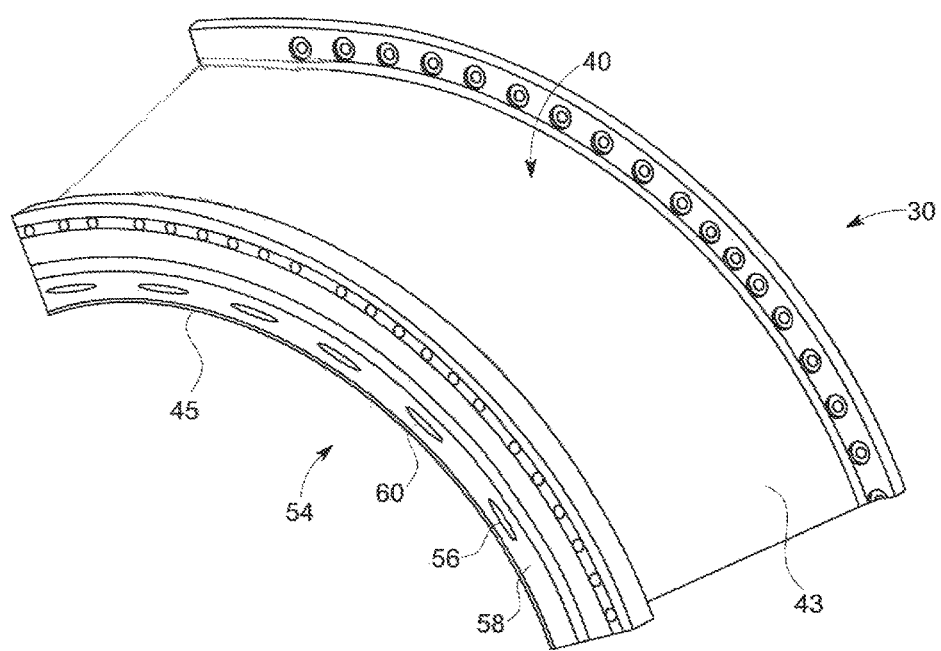
FIG. 2 is a partial perspective view of a turbine casing of turbomachine of FIG. 1.
Figure 3:
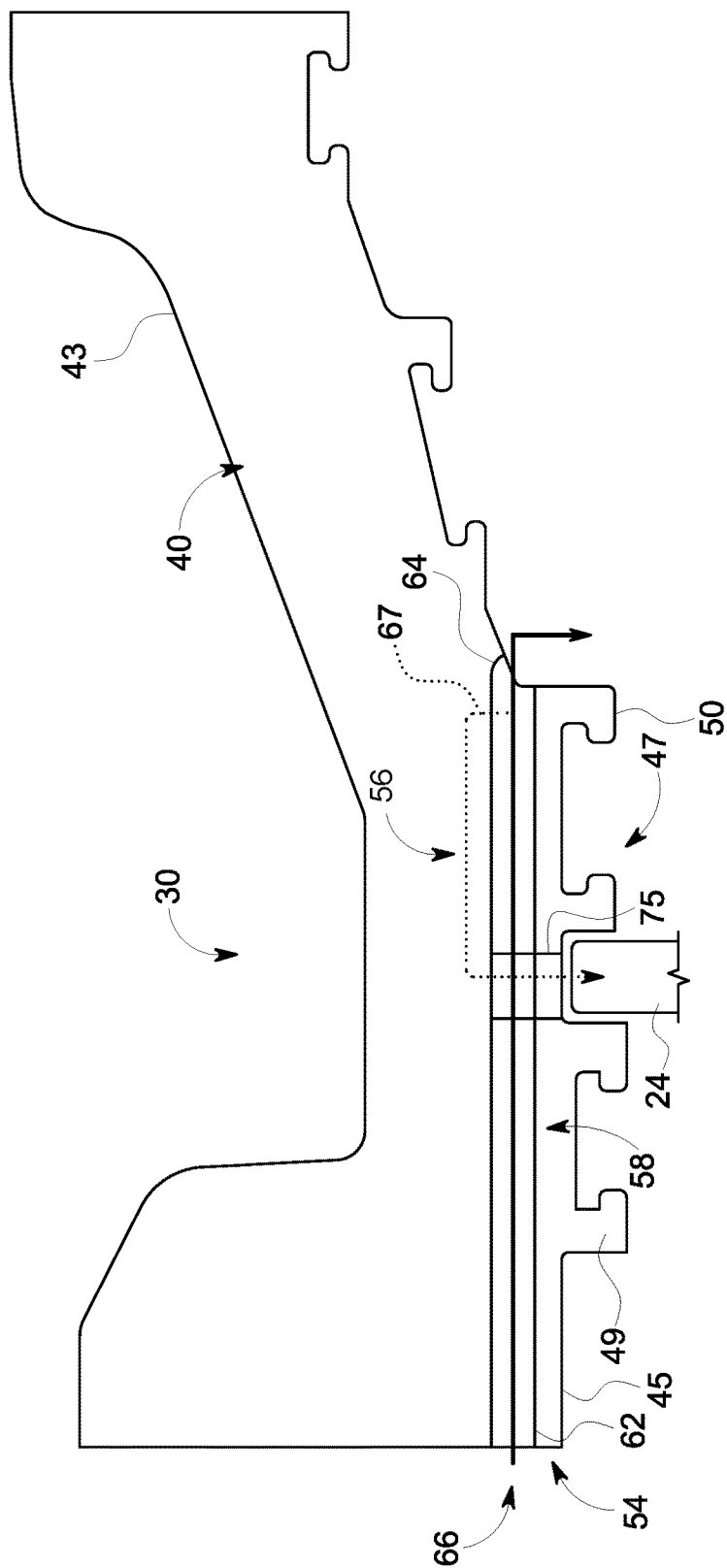
FIG. 3 is a partial cross-sectional side view of the turbine casing of FIG. 2.
Figure 4:
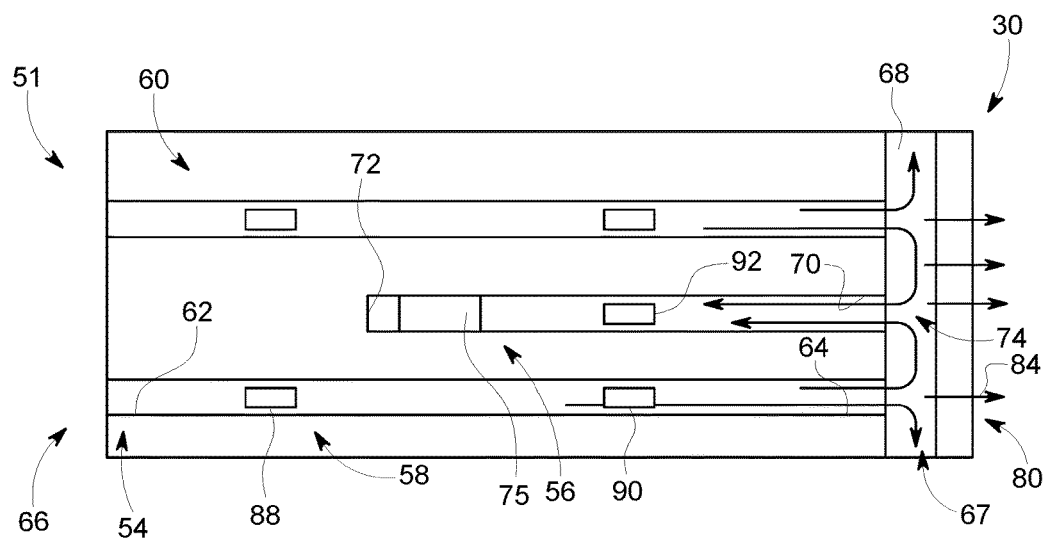
FIG. 4 is a schematic view of the clearance control system in turbine casing of FIG. 3.

In accordance with an exemplary embodiment, turbomachine 4 includes a casing or shell 30 that surrounds turbine portion 8. In accordance with an aspect of an exemplary embodiment illustrated in FIGS. 2-4, casing 30 may include a body 40 having an outer surface 43 and an inner surface 45. Inner surface 45 may include a plurality of hook members 47 (FIG. 3). Hook members 47 may take the form of, for example, shroud supports such as first stage shroud supports 49 and second stage shroud supports 50. First and second stage shroud supports 49 and 50 retain stators or shrouds, one of which is indicated at 52 in FIG. 1, to casing 30.

In accordance with an aspect of an exemplary embodiment, turbomachine 4 includes a clearance control system 51 (FIG. 4) that adjusts a clearance between tip portions (not separately labeled) of rotating airfoils 25 (FIG. 1) and shrouds 52 (FIG. 1) supported from hook members 47. In accordance with an aspect of an exemplary embodiment, clearance control system 51 takes the form of a passive clearance control system. By "passive" it should be understood that clearances are autonomously adjusted based solely on turbomachine operating parameters without any intervention of external programmed control systems and/or personnel.

Clearance control system 51 includes a plurality of fluidically connected fluid channels 54 extending through casing 30. Fluid channels 54 may include a non-circular cross-section and extend in a heat exchange relationship with hook members 47. Fluid channels 54 include a second stage fluid channel 56 that directs coolant thermal transfer fluid, which may take the form of compressor discharge air in a first axial direction, a first third stage fluid channel 58, and a second third stage fluid channel 60. First and second third stage fluid channels 58 and 60 direct thermal transfer fluid in a second axial direction that is opposite that first axial direction. First, third stage fluid channel 58 includes a first end 62 and a second end 64. First end 62 defines an inlet 66 that may be fluidically connected to compressor portion 6. Second end 64 is fluidically connected to a circumferential fluid channel 67. Circumferential fluid channel 67 may extend around a portion of a circumference of casing 30. Circumferential fluid channel 67 directs thermal transfer fluid. circumferentially about casing 30. Circumferential fluid channel 67 defines an outlet channel 68. Second third stage fluid channel 60 may include similar structure.

Figure 5:
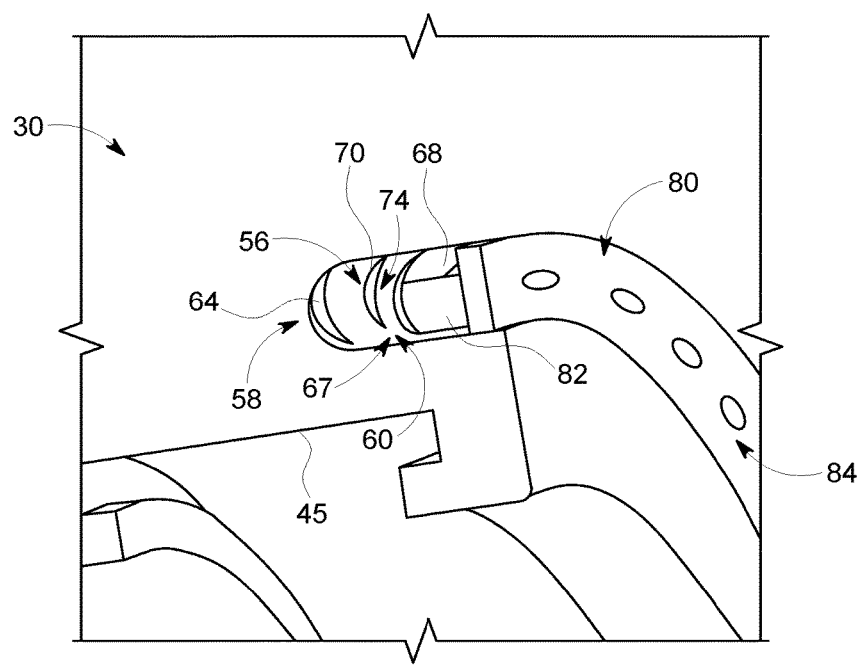
FIG. 5 depicts a portion of the clearance control system of FIG. 4.
Figure 6:
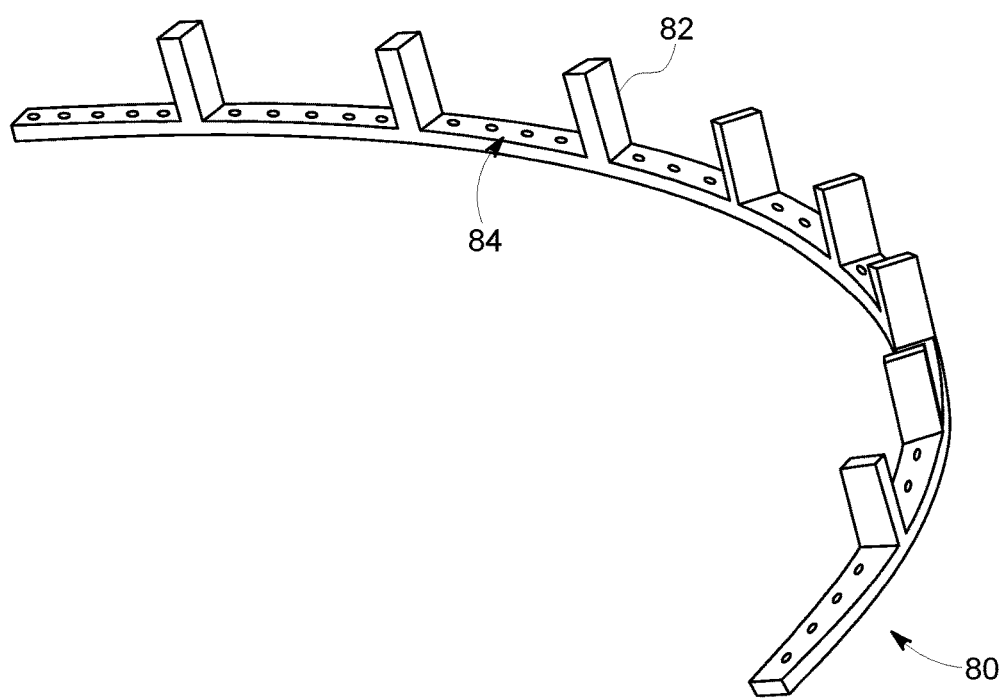
FIG. 6 depicts an orifice plate of the clearance control system of FIG. 5.

In further accordance with an aspect of an exemplary embodiment, second stage fluid channel 56 includes a first end portion 70 and a second end portion 72. First end portion 70 defines an inlet 74 fluidically connected to outlet channel 68. Second end portion 72 includes an outlet 75 that may be fluidically connected with stationary airfoil 24. With this arrangement, thermal transfer fluid passes into first and second third stage fluid channels 58 and 60. The thermal transfer fluid flows toward outlet channel 68. A portion of the thermal transfer fluid is redirected into second stage fluid channel 56. The thermal transfer fluid in second stage fluid channel 56 passes through outlet 75 into stationary airfoil 24. Another portion of the thermal transfer fluid flows through an orifice plate 80 provided at outlet channel 68, as shown in FIGS. 5 and 6. Orifice plate 80 may guide thermal transfer fluid into a third stage stationary airfoil (not separately labeled). Orifice plate 80 includes a plurality of supports, one of which is indicated at 82, that provide a desired spacing from an inner wall (not separately labeled) of outlet channel 68 and a plurality of openings 84. Openings 84 are sized to provide a desired back pressure to guide thermal transfer fluid into second stage fluid channel 56 while also facilitating passage of a desired amount of thermal transfer fluid.

In further accordance with an exemplary embodiment, clearance control system 51 may include first and second turbulators 88 and 90 arranged in first third stage fluid channel 58. Another turbulator 92 may be arranged in second stage fluid channel 56. Second third stage fluid channel 60 may also include turbulators (not separately labeled). Turbulators 88, 90, and 92 create a restriction that forms disturbances in thermal transfer fluid flowing through fluid channels 56, 58, and 60. The disturbances enhance heat exchange properties of the thermal transfer fluid. Thermal transfer fluid may flow through and/or over turbulators 88, 90, and 92 as will be detailed below.

Figure 7:
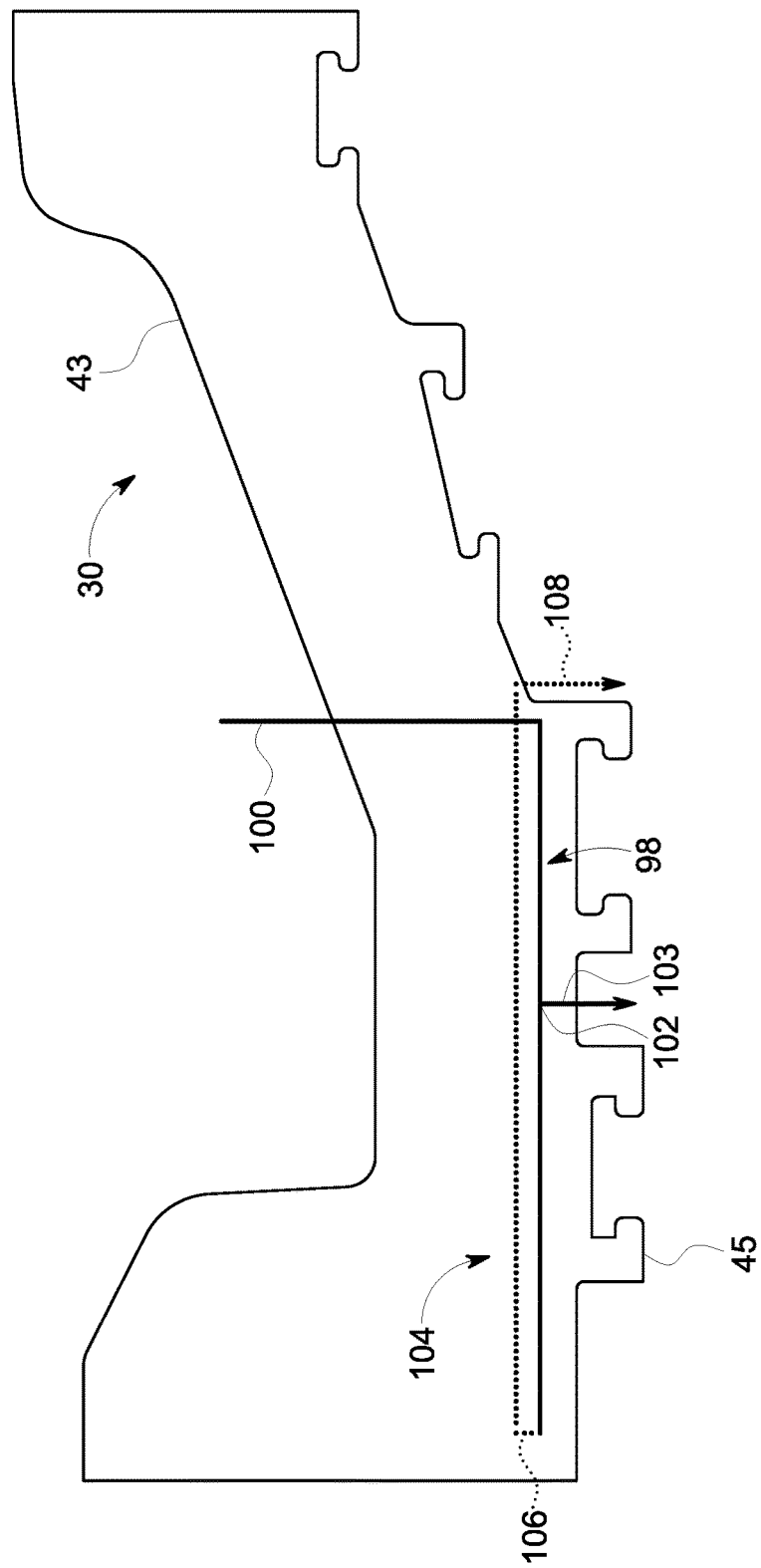
FIG. 7 depicts a cross-sectional side view of a turbine casing having a clearance control system, in accordance with an aspect of an exemplary embodiment.

In accordance with yet another aspect of an exemplary embodiment, illustrated in FIG. 7, a second stage fluid channel 98 includes an inlet 100 fluidically connected to an external source of thermal transfer fluid (not shown). Second stage fluid channel 98 also includes an outlet 102 that may be provided with an orifice plate 103 that delivers a thermal transfer fluid into stationary airfoil 24 (FIG. 1). A third stage fluid channel 104 is fluidically connected to second stage fluid channel 98 through a circumferential fluid channel 106. In a manner similar to that described above, circumferential fluid channel 106 may extend about, at least a portion of, a circumference of casing 30 and fluidically connected to a number of second and third stage fluid channels (not shown). Third stage fluid channel 104 includes an outlet 108 that may deliver thermal transfer fluid to a third stage stationary airfoil (not separately labeled).

Figure 8:
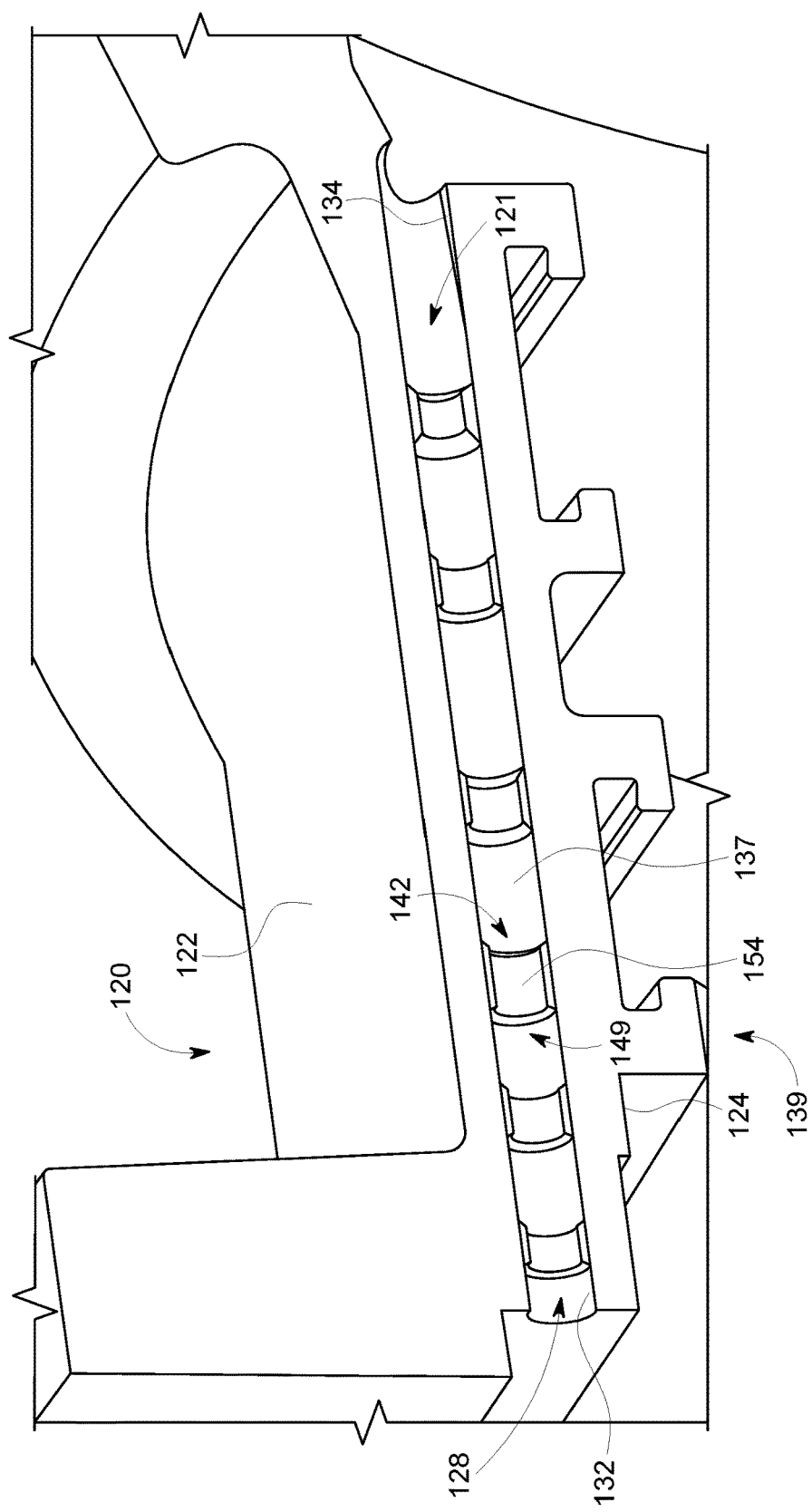
FIG. 8 depicts a partial cross-sectional view of a turbine casing having a clearance control system, in accordance with another aspect of an exemplary embodiment.

Reference will now follow to FIG. 8 in describing a casing 120 having a clearance control system 121 in accordance with another aspect of an exemplary embodiment. Casing 120 includes an outer surface 122 and an inner surface 124. Clearance control system 121 includes a fluid channel 128 extending through casing 120 between outer surface 122 and inner surface 124. Fluid channel 128 includes a first end 132 that may be fluidically connected to compressor portion 6, a second end 134 and an intermediate portion 137 extending therebetween. Second end 134 may be fluidically connected with hot gas path 22 of turbine portion 8. Further, second end 134 may be fluidically connected with hot gas path 22 through one or more stationary airfoils 24 (FIG. 1). Fluid channel 128 is arranged in a heat exchange relationship with a plurality of hook members 139 that extend from inner surface 124.

Figure 9:
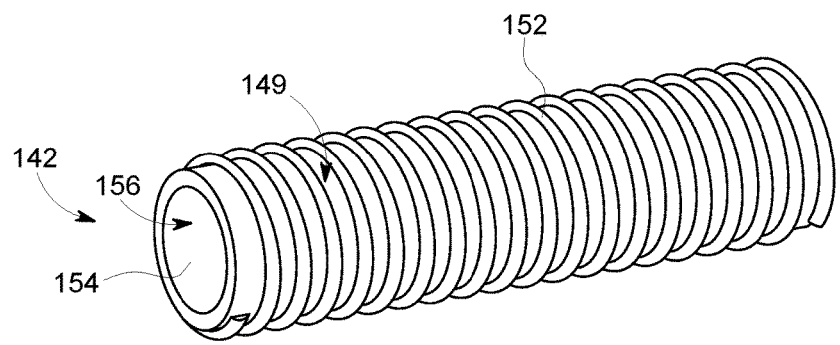
FIG. 9 depicts a perspective view of a turbulator of the clearance control system of FIG. 8.

In accordance with an aspect of an exemplary embodiment, a plurality of turbulators, one of which is indicated at 142, is arranged along intermediate portion 137 of fluid channel 128. As shown in FIG. 9, tabulator 142 may include a body 149 having an outer surface 152 and an inner surface 154 that defines a central passage 156. Central passage 156 forms a flow restriction that creates turbulence in thermal transfer fluid flowing through fluid channel 128. The turbulence increases heat exchange qualities of the thermal transfer fluid.

Figure 10:
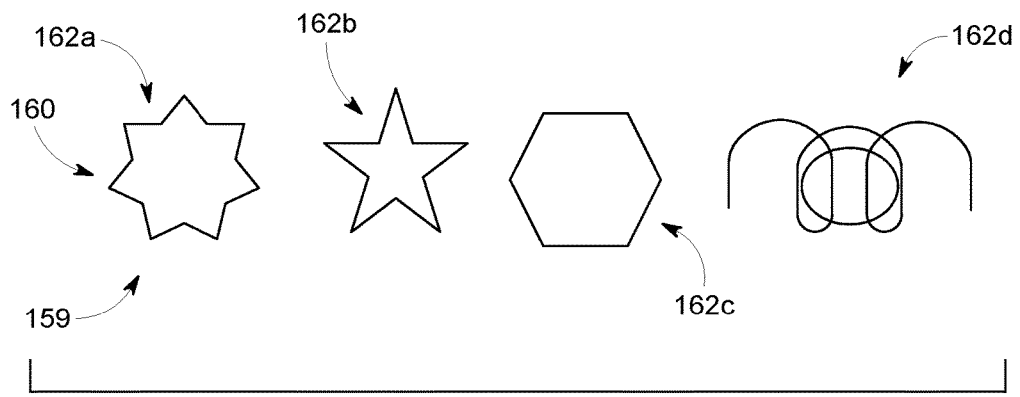
FIG. 10 depicts alternate turbulator geometries, in accordance with an aspect of an exemplary embodiment.
Figure 11:
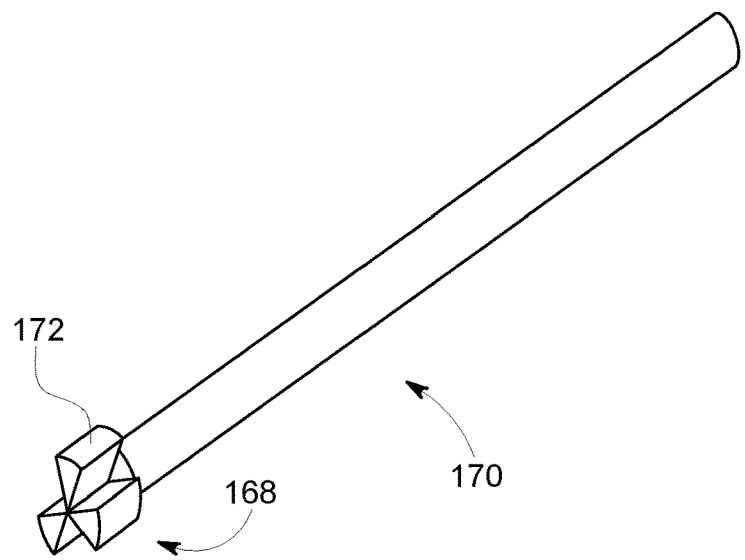
FIG. 11 depicts a turbulator, in accordance with another aspect of an exemplary embodiment.
Figure 12:
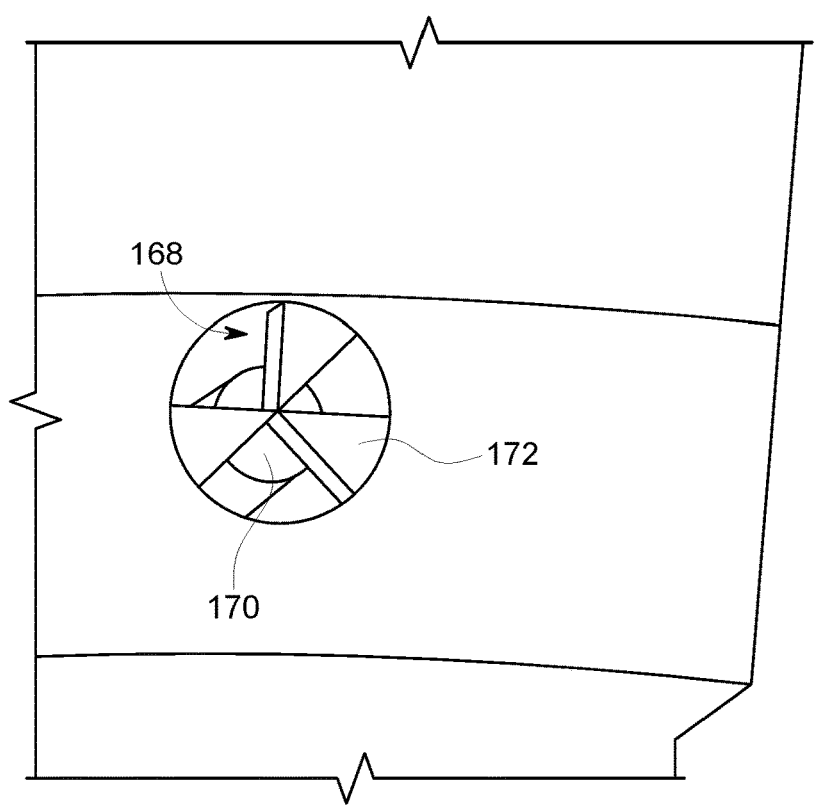
FIG. 12 depicts an end view of the turbulator of FIG. 11.

FIG. 10 illustrates tabulators 159 having a cross-sectional profile 160. More specifically, cross-sectional profile 160 may take the form of a multi-faceted geometric shape 162a, a star-like shape 162b, a hexagonal shape 162c, a convoluted profile 162d, or any other profile that allows thermal transfer fluid to flow along an outer surface (not separately labeled) and/or through an internal passage (also not separately labeled) of turbulators 159. FIGS. 11-12 depict a turbulator 168 in accordance with another aspect of an exemplary embodiment. Turbulator 168 is supported by a rod 170 that may extend through fluid channel 128. Turbulator 168 includes a plurality of lobes 172 that extend radially outwardly of rod 170. Lobes 172 create turbulence in thermal transfer fluid flow passing through fluid channel 128.

At this point, it should be understood that exemplary embodiments describe a system for controlling running clearances in a turbomachine. More specifically, the system employs fluid channels that may include turbulators that guide a thermal transfer fluid through a turbine casing. The thermal transfer fluid passes in a heat exchange relationship with the turbine casing. The turbine casing expands and/or contracts as a result of a thermal transfer through a presence and/or absence of thermal transfer fluid. The expansion and/or contraction of the turbine casing results in a shifting of the turbine shrouds causing a change in or adjustment of turbine running clearance. It should also be understood that the plurality of fluid channels may also be formed to include a generally circular cross-section. Further, it should be understood that the plurality of fluid channels may taper causing either a divergence or convergence of thermal transfer fluid flowing through the turbine casing, or may include a step feature resulting in a localized flow restriction that enhances thermal transfer between the thermal transfer fluid and the turbine casing.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A gas turbomachine comprising:
   a compressor portion;
   a turbine portion operatively connected to the compressor portion;
   a combustor assembly fluidically connected to each of the compressor portion and the turbine portion;
   a turbine casing extending about, at least in part, the turbine portion, the turbine casing including a body having a radially outer surface and a radially inner surface; and
   a clearance control system including a plurality of fluidically connected fluid channels extending between the radially outer and inner surfaces of the turbine casing, the plurality of fluidically connected fluid channels include a first fluid channel configured to direct a fluid flow in a first axial direction, a circumferential fluid channel configured to direct the fluid flow in a circumferential direction about the turbine casing, and a second fluid channel configured to direct the fluid flow in a second axial direction opposite the first axial direction, the first fluid channel including a first outlet passing through the radially inner surface, and the second fluid channel including a second outlet passing through the radially inner surface; and
   an orifice plate arranged at the first outlet, the orifice plate defining, at least in part, the circumferential fluid channel and including a plurality of openings.

2. The gas turbomachine according to claim 1, wherein the plurality of fluidically connected fluid channels includes a third fluid channel configured to direct the fluid flow in the first axial direction, the third fluid channel including a third outlet passing through the radially inner surface.

3. The gas turbomachine according to claim 2, wherein the orifice plate extends across the first and third outlets.

4. The gas turbomachine according to claim 1, further comprising: at least one turbulator arranged in the first fluid channel, the at least one turbulator being configured and disposed to enhance convective thermal transfer between a thermal transfer fluid and the turbine casing.

5. The gas turbomachine according to claim 4, further comprising: another turbulator arranged in the second fluid channel, the another turbulator being configured and disposed to enhance a convective thermal transfer between the thermal transfer fluid and the turbine casing.

6. The gas turbomachine according to claim 5, wherein each of the at least one turbulator and the another turbulator defines a flow restriction in the respective one of the first fluid channel and second fluid channel.

7. The gas turbomachine according to claim 1, wherein the clearance control system is a passive clearance control system configured and disposed to autonomously adjust a running clearance in the turbine portion.

8. The gas turbomachine according to claim 1, wherein the first fluid channel includes an inlet fluidically connected to the compressor portion.

9. The gas turbomachine according to claim 1, wherein each of the plurality of fluidically connected fluid channels includes a non-circular cross-section.

10. A gas turbomachine comprising:
    a compressor portion;
    a turbine portion operatively connected to the compressor portion;
    a combustor assembly fluidically connected to each of the compressor portion and the turbine portion;

a turbine casing extending about, at least in part, the turbine portion, the turbine casing including a body having a radially outer surface and a radially inner surface; and a clearance control system including a plurality of fluidically connected fluid channels extending between the radially outer and inner surfaces, at least one of the plurality of fluidically connected fluid channels including at least one turbulator configured and disposed to enhance convective thermal transfer between a thermal transfer fluid and the turbine casing, wherein the at least one turbulator is mounted to a rod extending through at least one of the plurality of fluidically connected fluid channels and the at least one turbulator includes a plurality of lobes projecting radially outwardly of the rod.

11. The gas turbomachine according to claim 10, wherein the at least one turbulator comprises a plurality of turbulators extending along at least one of the plurality of fluidically connected fluid channels.

12. The gas turbomachine according to claim 10, wherein the at least one turbulator includes a turbulator outer surface and a turbulator inner surface that defines a passage.

13. The gas turbomachine according to claim 12, wherein the turbulator outer surface includes a cross-sectional profile defining, together with an inner surface of the one of the plurality of fluidically connected fluid channels, another passage.

14. The gas turbomachine according to claim 13, wherein the cross-sectional profile includes a multi-faceted geometric shape.

15. The gas turbomachine according to claim 10, wherein each of the plurality of fluidically connected fluid channels is fluidically connected to the compressor portion.

16. The gas turbomachine according to claim 10, wherein the clearance control system is a passive clearance control system configured and disposed to autonomously adjust a running clearance in the turbine portion.

17. The gas turbomachine according to claim 10, further comprising an orifice plate positioned on the turbine casing and defining, at least in part, a circumferential fluid channel configured to direct a fluid flow in a circumferential direction about the turbine casing, the orifice plate including a plurality of openings.

18. A turbine casing for a gas turbomachine including a compressor portion, a turbine portion operatively connected to the compressor portion, and a combustor assembly fluidically connected to each of the compressor portion and the turbine portion, the turbine casing comprising:

a body extending about, at least in part, the turbine portion, the body including a radially outer surface and a radially inner surface, and the turbine casing including a plurality of shroud support elements, wherein at least two of the plurality of shroud support elements are located at distinct axial positions; and a clearance control system including a plurality of fluidically connected fluid channels extending between the radially outer and inner surfaces, at least one of the plurality of fluidically connected fluid channels including a turbulator configured and disposed to enhance convective thermal transfer between a thermal transfer fluid and the turbine casing, wherein the at least one turbulator is mounted to a rod extending through at least one of the plurality of fluidically connected fluid channels and the at least one turbulator includes a plurality of lobes projecting radially outwardly of the rod.

* * * * *